United States Patent [19]

Watson et al.

[11] Patent Number: 5,414,039
[45] Date of Patent: May 9, 1995

[54] REPULPABLE HOT MELT ADHESIVE FOR PACKAGING MATERIALS CONTAINING AN ETHYLENE VINYL ACETATE COPOLYMER HAVING 40-60 WEIGHT PERCENT OF VINYL ACETATE UNITS, A TACKIFIER AND A HIGH MOLECULAR WEIGHT OXYGEN-CONTAINING POLYMER

[75] Inventors: Michael D. Watson, Tulsa; William P. Cottom, Mounds; Susan M. Teeters, Sand Springs, all of Okla.; Charles H. Heroux, Scarborough, Canada; Terrance D. Duryee, Charlotte, N.C.

[73] Assignee: Petrolite Corporation, St. Louis, Mo.

[21] Appl. No.: 17,776

[22] Filed: Feb. 16, 1993

[51] Int. Cl.⁶ .................... C09J 123/08; C09J 131/04; C09J 173/00
[52] U.S. Cl. ..................... 524/502; 524/271; 524/272; 524/277; 524/504; 524/599; 524/612; 525/74; 525/80; 525/185; 525/190
[58] Field of Search ............... 524/271, 272, 277, 504, 524/502, 599, 612; 525/74, 80, 190, 185

[56] References Cited

U.S. PATENT DOCUMENTS

| | | | |
|---|---|---|---|
| 3,239,478 | 3/1966 | Harlan, Jr. ............... | 260/27 |
| 3,390,035 | 6/1968 | Sands ..................... | 156/72 |
| 3,417,040 | 12/1968 | Kremer .................. | 260/27 |
| 3,837,994 | 9/1974 | Flanagan et al. ......... | 161/100 |
| 4,237,037 | 12/1980 | Takahashi ............... | 525/74 |

(List continued on next page.)

FOREIGN PATENT DOCUMENTS

0045567A1 2/1982 European Pat. Off.
PCT/US90/-
 05599 4/1991 WIPO.

OTHER PUBLICATIONS

Bareco Division of Petrolite Corporation, "Microcrystalline Waxes in Protective Packaging", Release No. 305.0, (Feb. 1, 1976).

(List continued on next page.)

Primary Examiner—Vasu S. Jagannathan
Attorney, Agent, or Firm—Pravel, Hewitt, Kimball & Krieger

[57] ABSTRACT

A composition is which, when added to an ethylene vinyl acetate copolymer having 40 to 60 weight percent of vinyl acetate units, renders a repulpable hot melt adhesive comprises a tackifier and an oxygen-containing polymer. The oxygen-containing polymer may be either (i) a high molecular weight carboxylic acid; (ii) a ethylenically unsaturated cyclic anhydride graft polyolefin or (iii) a primary linear polymeric alcohol of the formula $$A-B$$

wherein A is represented by a unit of the formula $$CH_3(\underset{\underset{R}{|}}{C}H\underset{\underset{R_1}{|}}{C}H)_x$$

and B is represented by a unit of the formula $$CH_2O(CH_2\underset{\underset{R_2}{|}}{C}HO)_yH$$

where R and $R_1$ are independently selected from the group consisting of hydrogen and a $C_1$-$C_{10}$ alkyl group; $R_2$ is hydrogen or a $C_1$-$C_5$ alkyl group; x is greater than or equal to 1 but less than 70; and y is between 0 about 45; provided the weight ratio of $B/A+B$ is between 0 and 50 percent. The molecular weight of the alkyl unit of the oxygen-containing polymer is less than 2,000. Such adhesive compositions, which may further contain wax and/or an alkoxylated alcohol have particular applicability when used in combination with recyclable paper.

25 Claims, 1 Drawing Sheet

U.S. PATENT DOCUMENTS

| | | | |
|---|---|---|---|
| 4,299,745 | 11/1981 | Godfrey | 260/28.5 |
| 4,299,930 | 11/1981 | Boggs | 525/74 |
| 4,405,747 | 9/1983 | Ebmann et al. | 524/503 |
| 4,434,261 | 10/1989 | Brugel et al. | 524/109 |
| 4,871,803 | 10/1989 | Zimmel et al. | 525/89 |
| 4,992,501 | 2/1991 | Hanninen et al. | 524/272 |
| 5,055,526 | 10/1991 | Sato et al. | 525/74 |
| 5,071,914 | 12/1991 | Zimmel et al. | 525/113 |

OTHER PUBLICATIONS

Doshi et al., "Additives to Combat Sticky Contaminants in Secondary Fibers", 1989 Contaminant Problems and Strategies in Wastepaper Recycling, TAPPI Seminar Notes, pp. 81–89.

Graves et al., "A Study of the Effects of Wax Structure on the Performance Properties of EVA Based Hot Melt Adhesives", reprint of paper presented at 1987 ASC Raw Materials Seminar in Cincinnati, Ohio.

McKinney, "A Review of Stickie Control Methods, Including the Role of Surface Phenomena in Control", 1989 Contaminant Problems and Strategies in Wastepaper Recycling, TAPPI Seminar Notes, pp. 101–107.

Unmuth et al., "Hot Melt Laminants, Background and intercomparison", a paper presented at the Technical Session of the Hot Melt Committee held at the 1972 Paper Synthetics Conference of TAPPI.

J. D. Domine et al., "Ethylene Copolymer Based Hot Melt Adhesives" (1969).

"ELVAX® and Wax–Components in Formulated Hot Melt Adhesives", ELVAX® Technical Notes, Start with Dupont, May 1993.

Lennert, "What's Up at P&G in Composting and Recycling", The Journal of The Adhesive and Sealant Council, Inc., vol. XXI, No. 1, pp. 127–133, Spring 1992, Paper presented at ASC's 1992 Spring Seminar, Mar. 29–Apr. 1, Indianapolis, Ind.

Garbutt, "A Technical Perspective of the Effect of Hot Melt Adhesives on the Recycling of Post Consumer Recovered Paper/Paperboard Materials", vol. XXI, No. 1, pp. 159–164, Spring 1992, Paper presented at ASC's 1992 Spring Seminar, Mar. 29–Apr. 1, Indianapolis, Ind.

REPULPABLE HOT MELT ADHESIVE FOR PACKAGING MATERIALS CONTAINING AN ETHYLENE VINYL ACETATE COPOLYMER HAVING 40-60 WEIGHT PERCENT OF VINYL ACETATE UNITS, A TACKIFIER AND A HIGH MOLECULAR WEIGHT OXYGEN-CONTAINING POLYMER

BACKGROUND OF THE INVENTION

Solid waste management has long captured the public's attention. As landfills continue to close, new avenues must be opened for recycling municipal solid waste—paper and paperboard products, containers and other packaging.

Molten adhesive compositions, commonly referred to as hot melt adhesives, are normally used in the manufacture of paper products. Products which have been recycled from such paper products are often characterized by heavy spotting. Such spots are formed when the waste material is heated. As a result, the conversion of municipal solid waste materials containing hot melt adhesives to desirable recycled end-products has been relatively unsuccessful.

Hot melt adhesive particulates have been identified as the source of other problems encountered in mills; such as deposition on wire and press felts and doctor blades; breaks at the wet end or during rereeling; and product quality deterioration due to sheet holes. Productivity and monetary losses have therefore been high.

The recycling of wastepaper from materials containing hot melt adhesives proceeds generally by one of three methods. In two of the methods, the hot melt adhesive is separated from a water slurry of the recycled fibers using either cleaners or screens. When screens are employed, the pulp slurry is passed through a cylindrical screen plate fitted with small holes or fine vertical slots. The particles of hot melt adhesives are separated out and rejected. When cleaners are used, the pulp slurry is pumped into the cleaner to form a spiraling flow. The slurry is subjected to a centrifugal field. A central core is formed in which the particles of hot melt adhesives concentrate. A portion of the pulp slurry is extracted from this central core carrying the rejected hot melt adhesive particles.

In the third method, a thickened pulp slurry is heated to a temperature, generally ranging from 180° F. to 250° F. It is then subjected to an intensive shearing and/or kneading action. The hot melt particles are broken down to fine sizes, thereby minimizing spotting. Considerable energy is expended, however, in the process.

In the design of modern recycling systems, interest has been centered on those properties of hot melt adhesives which are useful in the separation of the adhesive particulates from the pulp slurry. Much attention has been paid to the size of the hot melt adhesive particulate and its resistance to breakup when the wastepaper is wetted and broken up in a pulper. Pulpers have been specifically designed to minimize breakup of the hot melt particulate during the pumping action. The larger particulates are separated from the pulp slurry with screens. To separate hot melt adhesive particles that pass through the screens, the pulp slurry is pumped into a through-flow cleaner wherein the smaller hot melt adhesive particulates are removed.

Molten adhesives must be repulpable in order to maximize wastepaper quality. Hot melt adhesives typically comprise an elastomeric resin and a tackifying resin. Antioxidants, fillers and plasticizers may further be incorporated. The elastomeric resin serves to form the backbone and contributes to the cohesive strength and toughness of the composition. Tackifying resins promote specific adhesion and help the adhesive to wet the substrate. In addition, a wax is frequently added to fine tune such adhesive properties as tensile strength, high temperature performance, compatibility and flexibility. Waxes further serve to decrease melt viscosity, increase the crystallinity and control the open and set times of the elastomeric resin.

It has been previously reported that improved adhesive strength and high temperature properties can result when primary alcohols are used in place of hydrocarbon waxes. Such compositions unfortunately were not repulpable due to their poor dispersability factor.

It is most desired to develop a hot melt adhesive which is dispersible in aqueous systems and is compatible and recyclable. Compatibility is defined as the ability of the composition to impart adhesive properties to contiguous layers. Compatibility may be measured by various means such as viscosity stability, melt flow characteristics and cloud point. In particular, compatibility references the physical state wherein the elastomeric resin, tackifier and other additives are in a homogenous indistinct blend. In an incompatible adhesive, the elastomer, tackifier and additives are in discrete areas in the molten state.

SUMMARY OF THE INVENTION

A hot melt adhesive, repulpable in commercial milling operations, has been found to be compatible by the use of certain oxygen-containing high molecular weight polymers. In accordance with the present invention, a composition is provided which (when added to an ethylene vinyl acetate copolymer having about 40 to about 60 weight percent of vinyl acetate units) will render a hot melt adhesive which is dispersible in water and which is further repulpable.

The oxygen-containing polymer can be either a primary linear polymeric alcohol, a high molecular weight carboxylic acid or a cyclic anhydride graft polyolefin. The molecular weight of the alkyl moiety of the polymer is less then or equal to 2,000. It is the addition of the oxygen containing high molecular weight polymer to the ethylene vinyl acetate copolymer which increases the compatibility of the copolymer and tackifier, thereby resulting in a repulpable hot melt adhesive.

The invention is further drawn to hot melt adhesive compositions containing such formulations. The present invention therefore is an improvement over modern recycling methods by making repulpable paper products containing such adhesive systems.

A particular preferred oxygen-containing polymer for use in the composition and the hot melt adhesive formulation of the present invention is an alcohol of the formula

wherein A is represented by a unit of the formula

and B is represented by a unit of the formula $$\underset{CH_2O(CH_2CHO)_yH}{\overset{R_2}{|}} \quad (IB)$$

and further wherein R and $R_1$ are independently selected from the group consisting of hydrogen and a $C_1$-$C_{10}$ alkyl group; $R_2$ is hydrogen or a $C_1$-$C_5$ alkyl group; x is greater than or equal to 1 but less than 70; and y is between about 0 to about 45; provided the weight percent of B/A+B is between 0 and 50 percent and the molecular weight of the A unit is less than 2,000, A portion of the oxygen-containing polymer may be substituted with an alkoxylated alcohol of the formula $$C-D \quad (II)$$

wherein C is represented by a unit of the formula $$\underset{CH_3(CHCH)_g}{\overset{R \;\; R_1}{|\;\;|}} \quad (IIC)$$

and D is represented by a unit of the formula $$\underset{CH_2O(CH_2CHO)_hH}{\overset{R_2}{|}} \quad (IID)$$

and further wherein R and $R_1$ are independently selected from the group consisting of hydrogen and a $C_1$-$C_{10}$ alkyl group; $R_2$ is hydrogen or a $C_1$-$C_5$ alkyl group; g is between about 1 to about 142; and h is between about 2 about 817; provided that the weight ratio of D/C+D is between 51 and about 90. Such alkoxylated alcohols have been found to increase the repulpability of the hot melt adhesive.

In addition, the oxygen-containing polymer can be partially replaced with a hydrocarbon wax.

DESCRIPTION OF THE PREFERRED EMBODIMENTS

Figure 2:
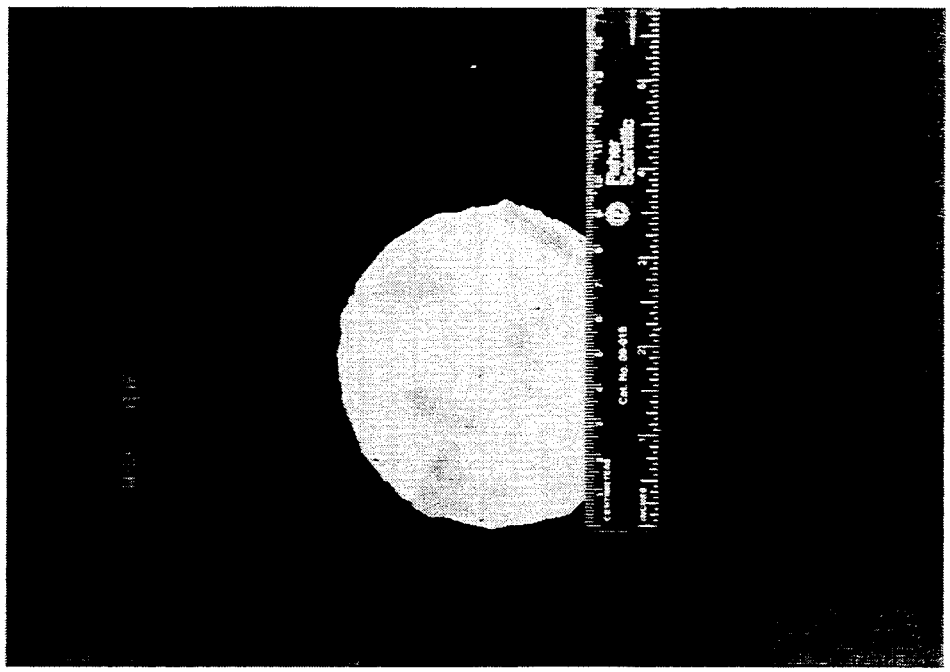
FIG. 2 is a photograph of repulped paper which contains an adhesive system containing a conventional ethylene vinyl acetate copolymer. The system further does not contain the high molecular weight oxygen-containing polymer of this invention.

Compositions are provided which are capable of rendering hot melt adhesives repulpable. Such compositions comprise an oxygen-containing polymer and a tackifier. When combined with an ethylene vinyl acetate copolymer, having from about 40 to about 60 weight percent, most preferably 45 to 50, of vinyl acetate units, a compatible, dispersible and repulpable hot melt adhesive is rendered. The high vinyl acetate content of the copolymer increases the dispersability and repulpability of the resin as compared to conventional ethylene vinyl acetate copolymers which have a vinyl acetate content of approximately 28 percent. The latter when combined with the oxygen-containing polymer of this invention are neither dispersible or repulpable.

The invention further relates to a hot melt adhesive formulation containing the above-described ethylene vinyl acetate copolymer having a high percentage of vinyl acetate units, high molecular weight oxygen-containing polymer and tackifier. About 5 to 45, preferably 15 to 40, most preferably 30, weight percent of the hot melt adhesive composition of this invention is the ethylene vinyl acetate copolymer. The amount of oxygen-containing polymer in the hot melt blend is also 5 to 45, preferably 15 to 40, most preferably 30, weight percent of the hot melt adhesive composition. Most preferably, the weight percentage of the ethylene vinyl acetate copolymer in the hot melt adhesive is approximately equivalent to the weight percentage of the total of the oxygen-containing polymer, replacement hydrocarbon wax (if applicable) and alkoxylated alcohol of formula (II) (if applicable).

Elastomeric resins containing a high percentage of vinyl acetate wherein the amount of vinyl acetate is greater than 40% include the ELVAX® series of resins, such as ELVAX® 46 and ELVAX®46L, of Du Pont-Mitsui Polychemicals Ltd.

The use of such resins by themselves are unsuitable for use as hot melt adhesives since they are incompatible with conventional tackifiers and waxes. Such resins have been found to be compatible however when an oxygen-containing polymer is present. The oxygen-containing polymer, when used in an adhesive blend containing an ethylene vinyl acetate copolymer having high vinyl acetate content, results in a compatible repulpable adhesive that maintains good adhesive properties.

The oxygen-containing polymer may be a high molecular weight alcohol, a high molecular weight carboxylic acid or a cyclic anhydride graft polyolefin.

The molecular weight of the alkyl (carbon,hydrogen) portion of the oxygen-containing polymer is less than 2,000 preferably less than 1,500, most preferably less than 1,000.

The high molecular weight carboxylic acid is preferably a monocarboxylic acid of the formula RCOOH wherein R is a straight or linear saturated hydrocarbon chain of molecular weight less than 2,000. When the oxygen-containing polymer is a monocarboxylic acid, the molecular weight of R is most preferably between 300 and 800.

The oxygen-containing polymer can further be a hydrocarbon having multiple functional groups, such as carboxylic acid, carboxylic acid anhydrides, ketones, alcohols, esters, etc., distributed along their chains or are the result of a graft polymerization process. Particularly preferred are linear polyolefins, such as the polyethylenes, upon which has been grafted cyclic anhydrides such as maleic, fumaric and itaconic acid anhydride. Maleic acid anhydride is particularly preferred. The acid groups are grafted onto a polyolefin backbone which typically is polyethylene, polypropylene, and copolymers of ethylene and propylene. The functional groups of the graft copolymers may be generally quantified by determination of an acid number which is the amount of potassium hydroxide in milligrams required to neutralize one gram of the polymer. Such graft copolymers further generally have an acid number in the range of from about 5 to about 200.

Still preferred as the oxygen-containing polymer are those polymeric alcohols of the formula $$A-B \quad (I)$$

wherein A is represented by a unit of the formula

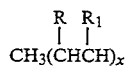  (IA)

and B is represented by a unit of the formula

  (IB)

and further wherein R and $R_1$ are independently selected from the group consisting of hydrogen and a $C_1$–$C_{10}$ alkyl group; $R_2$ is hydrogen or a $C_1$–$C_5$ alkyl group; x is greater than or equal to 1 but less than 70, preferably from about 9 to about 60, most preferably from about 11 to about 45; and y is between about 0 to about 45, preferably 3 to 40, most preferably 14 to 25; provided the weight percent of B/A+B is between 0 and 50 percent and the molecular weight of the A units are less than 2,000, preferably less than 1500, most preferably less than 1,000. The weight percent of B/A+B is preferably between 0 and 20 percent.

Exemplary of suitable polymeric alcohols for use in the several embodiments of this invention (wherein y is zero) are those of the formula

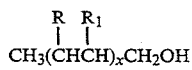  (III)

wherein R and $R_1$ individually represent hydrogen or the same or different lower alkyl groups of from 1 to about 10 carbon atoms; and x is greater than or equal to 1 but less than 70, and preferably from about 9 to about 60. Such alcohols are commercially available under the trade name UNILIN ® alcohols from Petrolite Polymers Division of Petrolite Corporation, Tulsa, Okla. Examples of such long chain primary alcohols are UNILIN ®-425, UNILIN ®-550 and UNILIN ®350 which have a molecular weight of about 425, 550, and 350, respectively.

Further preferred is an adhesive system containing an alcohol (y of formula IB is greater than or equal to 1) wherein the A unit has a molecular weight between about 350 to about 1,000. Especially preferred alcohols include UNITHOX ® 420 and UNITHOX ® 520. UNITHOX ® 420 and 520 are ethoxylated alcohols which consist of 80 weight percent of units of the formula IA:

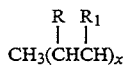  (IA)

and 20 weight percent of ethoxylate units of the formula:

  (IB)

wherein R, $R_1$ and $R_2$ are all hydrogen. The molecular weight of the units of formula IA of UNITHOX ® 420 and UNITHOX ® 520 is about 425 and 550, respectively. Such products are commercially available from Petrolite Polymers Division in Tulsa, Okla.

Especially preferred alcohols for use in formulating hot melt adhesives of this invention are those represented by formula (I) above wherein R and $R_1$ are independently selected from the group consisting of —H and $C_1$–$C_{10}$ alkyl and $R_2$ is —H or a $C_1$–$C_5$ alkyl group. Most preferred are those compounds represented by the formula:

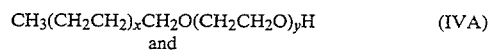  (IVA)

and

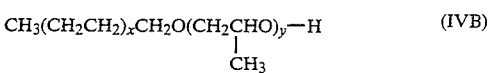  (IVB)

as well as mixtures thereof. As an alternative the compound may be of formula (I) above where $R_2$ is randomly selected from the substituents —H and —$CH_3$.

The preferred alcohols of this invention typically average 24 to 45 carbon atoms (on a weight basis), preferably 28 to 42 carbon atoms, most preferably about 30 to 40 carbon atoms. Such alcohols are derived by hydroxylating long chain hydrocarbons.

The ethylene vinyl acetate copolymers are compatible with the oxygen-containing polymers. Such polymers render the dispersible resin and tackifier compatible. The use of the oxygen-containing polymer further renders an adhesive system which is repulpable while exhibiting good adhesive properties.

The tackifying resin serves to extend the adhesive properties of the elastomeric polymer. Such tackifying resins include (1) natural and modified rosins, such as gum rosin, wood rosin, tall oil rosin, distilled rosin, hydrogenated rosin, dimerized rosin and polymerized rosin; (2) glycerol and pentaerythritol esters of natural and modified rosin such as, for example, the glycerol ester of pale, wood rosin, the glycerol ester of hydrogenated rosin, the glycerol ester of polymerized rosin, the pentaerythritol ester of hydrogenated rosin and the phenolic-modified pentaerythritol ester of rosin; (3) polyterpene resins especially those resulting from the polymerization of terpene hydrocarbons, such as the bicyclic mono-terpene known as pinene, in the presence of Friedel-Crafts catalysts; (4) chlorinated terphenyl resins containing from about 42 to 60%, by weight, of chlorine; (5) phenolic-modified terpene resins such as, for example, the resin product resulting from the condensation in an acidic medium of a bicyclic terpene and a phenol; and (6) aliphatic petroleum hydrocarbon resins principally those resulting from the polymerization of monomers consisting primarily of olefins and diolefins. Excellent results have been obtained with polymerized rosin pale, wood rosin, the glycerol ester of hydrogenated rosin, the glycerol ester of polymerized rosin, the pentaerythritol ester of hydrogenated rosin, and phenolic-modified pentaerthyritol ester of rosin which has been hydrogenated. Terpene and coumarone-indene resins are also employed. Polyterpene-resins (obtained by distillation of conifers), phenolic resins, and petroleum hydrocarbon resins, maleic anhydride-modified rosin and rosin derivatives, partial esters of styrene-maleic acid copolymers, chlorinated biphenyls and oil-soluble phenol-aldehyde resins cart also be used.

Effective proportion of tackifier for use in the present invention is about 20 to about 70, preferably 30 to 60, most preferably 40 to 50, weight percent of the hot melt adhesive composition.

As set forth above, the oxygen-containing polymer may be packaged with the tackifier such that the end user need only add the packaged material to the ethylene vinyl acetate copolymer to obtain the hot melt adhesive. Alternatively, the oxygen-containing polymer may be packaged with an ethylene vinyl acetate copolymer such that the end user need only add the packaged material to a tackifier. Still, the oxygen-containing polymer may be packaged by itself. The end user would therefore need to add the packaged material to both tackifier and ethylene vinyl acetate copolymer.

The oxygen-containing polymer may be partially substituted with a linear or branched chain aliphatic hydrocarbon wax. The weight ratio of the oxygen-containing polymer to linear or branched chain aliphatic hydrocarbon wax should exceed 1:1. Preferably, the weight ratio of oxygen-containing polymer to hydrocarbon wax hot melt adhesive composition is greater than 2:1. Suitable waxes include such synthetic waxes as polyolefin waxes, such as polyethylene wax, and natural waxes such as petroleum-derived waxes like paraffin and microcrystalline waxes. Preferred are those having a molecular weight of about 300 to about 5,000.

The polyolefin wax may be generally described as preferably having a molecular weight of about 700 to 3,000 and may be linear or have a number of branch formations in its molecular structure. When branched, polyethylene wax preferably has one or two branches per molecule on the average and the branches may have 1 to 6 carbon atoms, preferably $C_1$–$C_6$ alkyl groups.

The paraffin waxes are mostly linear alkanes having about 20–36 carbon atoms per molecule on the average and a molecular weight of about 280–500 and may include $C_{18}$–$C_{26}$ isoalkanes and cycloalkanes.

Microcrystalline waxes generally are refined from crude oil tank bottoms or lube stocks. They are generally higher in molecular weight, about 500–700, with somewhat more branching than the paraffin waxes. In addition, microcrystalline waxes are generally softer than paraffin waxes. Since they are residual fractions of distilled petroleum composition, molecular weight distribution and crystallinity of the microcrystalline wax depends on the petroleum feedstock.

Furthermore, the wax of the present invention may include such synthetic waxes as Fischer-Tropsch waxes. Such waxes are polymethylenes. Polymethylene wax production is based on the Fischer-Tropsch synthesis, which is basically the polymerization of carbon monoxide under high pressure to produce the wax. The polymethylene waxes useful herein preferably may have an average molecular weight of 600–1,000. Other synthetic waxes are those produced by polymerizing ethylene, or other alkenes. Branching is introduced in such waxes by copolymerizing ethylene and other alkenes.

Other closely related materials that can be used include the natural waxes, such as beeswax, carnauba and candelila waxes. In addition, the composition of this invention may contain a mixture of any of the waxes set forth above.

Also contemplated in the present invention is the substitution of a portion of the oxygen-containing polymer with a wax which has been chemically modified. These include the partially oxidized polyethylenes, polymethylenes and the petroleum-derived waxes.

It is further possible to substitute a portion of the oxygen-containing polymer with an alkoxylated alcohol. Such alkoxylated alcohols have been found to increase the repulpability of the hot melt adhesive. The weight ratio of the oxygen-containing polymer to alkoxylated alcohol should be greater than 1:1. When the oxygen-containing polymer is substituted with both alkoxylated alcohol and linear or branched chain aliphatic hydrocarbon wax, no greater than 49% of the oxygen-containing polymer should be substituted with these materials. The weight ratio of oxygen-containing polymer to alkoxylated alcohol, is most preferably less than 3:1.

Exemplary of the alkoxylated compounds used in formulating the hot melt adhesives of this invention are represented by the formula:

$$C-D \qquad (II)$$

wherein C is represented by a unit of the formula

$$\begin{array}{cc} R & R_1 \\ | & | \\ CH_3(CHCH)_g \end{array} \qquad (IIA)$$

and D is represented by a unit of the formula $$\begin{array}{c} R_2 \\ | \\ CH_2O(CH_2CHO)_hH \end{array} \qquad (IIB)$$

and further wherein R and $R_1$ are independently selected from the group consisting of hydrogen and a $C_1$–$C_{10}$ alkyl group; $R_2$ is hydrogen or a $C_1$–$C_5$ alkyl group; g is between about 1 to about 142, preferably from about 9 to about 113, most preferably 11 to 45; and h is between about 2 to about 817, preferably 3 to about 65, most preferably 4 to 50; provided that the weight percent of D/C+D is between 51 and about 90, preferably 75 to 85, most preferably 80. The average molecular weight of formula (IIA) may range from about 200 to about 4,000, preferably no greater than 1,000. (When the average molecular weight is 1,000, g is 34.)

Especially preferred alkoxylated alcohols include UNITHOX® 480 and UNITHOX® 580. UNITHOX® 580 is an ethoxylated alcohol which consists of 20 weight percent of units of the formula IIA:

$$\begin{array}{cc} R & R_1 \\ | & | \\ CH_3(CHCH)_g \end{array} \qquad (IIA)$$

and 80 weight percent of ethoxylate units of the formula:

$$\begin{array}{cc} R & R_2 \\ | & | \\ CH_3O(CHCH)_h \end{array} \qquad (IIB)$$

wherein R, $R_1$ and $R_2$ are all hydrogen. Such products are commercially available from Petrolite Polymers Division in Tulsa, Okla.

When the oxygen-containing polymer is a primary linear polymeric alcohol and a portion of the primary linear polymeric alcohol is substituted with an alkoxylated alcohol of formula (II), best results are obtained when the value of x in the A unit of formula (IA) above and the value of g in the A unit of formula (IIA) for the alkoxylated alcohol are identical.

Antioxidants, fillers and plasticizers may further be incorporated in the adhesive system of this invention.

A stabilizer can further be added to the adhesive system of the invention. Such stabilizers serve to enhance the pot-life of the molten adhesive. Typically useful stabilizers or antioxidants for the adhesive composition are the 2,4,6-trialkylated monohydroxy phenols, e.g., 2,4,6-tri-tertiarybutyl phenol and 2,6-di-tertiary-butyl-4-methyl phenol, 4,4'-thio-bis (6-tertiary butyl m-cresol); butylated hydroxy anisole and butylated hydroxy toluene. Effective proportions of stabilizer ordinarily are in the range of from about 25 parts per million to about 0.5 part per 100 parts by weight of the adhesive composition, preferably about 0.1 to 0.4 part per 100.

The alcohols comprising the oxygen-containing polymer and the alkoxylated alcohols of the present invention are prepared by reacting an alcohol with an oxyalkylating agent such as ethylene oxide, propylene oxide and mixtures thereof. Conventional base catalysts, such as potassium hydroxide, sodium hydroxide, sodium ethoxide, potassium t-butoxide, sodium hydride or sodium or potassium metals, are used in the reaction. The reaction is normally conducted under pressures of 0 to 60 psig and at temperatures of 212° to 356° F. (100° to 180° C.). Higher temperatures are normally avoided to minimize side reactions and color formation.

By varying the molecular weight of the starting alcohol and the amount of alkoxylation, a variety of compounds of varying molecular weights can be prepared. Thus, the molecular weight of the starting alcohol may be known to have an average molecular weight of from about 270 to about 2,000.

The compositions of this invention are extremely useful in formulating as repulpable adhesives for those cellulose containing products consisting of light to heavy paper products including tissue, newsprint, Kraft paper, cardboard stock and the like. The paper can be light weight, such as facial tissue, to heavy fiber stock such as corrugated cardboard manufacture. The paper face stock may be formed of any pulpable cellulosic fiber material, virgin and recycled.

The hot melt adhesives of this invention may be produced by a variety of methods. Normally, the components are blended in a mixer and heated until molten. The molten oxygen-containing polymers may be added directly to a vessel containing the elastomer, tackifier and other components such as wax and stabilizer, when used. Alternatively, where the oxygen-containing polymer is partially substituted with an alkoxylated alcohol or hydrocarbon, the blend may be added at a range of 60°–120° C. to a blend of elastomeric and tackifier (and stabilizer when present) at a temperature between 140° C. and 180° C.

In addition, it is possible to combine the ethylene vinyl acetate copolymer in a molten state to a vessel containing the oxygen-containing polymer and other ingredients comprising the hot melt adhesive formulation.

The invention further relates to a composition comprising ethylene vinyl acetate having about 40 to about 60 weight percent of vinyl acetate units and an oxygen-containing polymer as set forth above. Such compositions may be packaged separately for formulating with a tackifier. The composition contains a weight ratio of about 5:95 to 95:5, preferably 40:60 to 60:40, most preferably a 50:50 ratio, of ethylene vinyl acetate copolymer to oxygen-containing polymer.

The following examples will illustrate the practice of the present invention in its preferred embodiments. Other embodiments within the scope of the claims herein will be apparent to one skilled in the art from consideration of the specification and practice of the invention as disclosed herein. It is intended that the specification, together with the examples, be considered exemplary only, with the scope and spirit of the invention being indicated by the claims which follow.

In the following examples, all percentages are on a weight/weight basis unless otherwise indicated. Shear and peel adhesion temperature tests were conducted as follows. Strips of 75 pound Kraft paper were coated with approximately 5 mils of adhesive using a drawndown bar. The strips were cut to 2×3 inches and sealed to uncoated Kraft paper using a Sentinel Sealer at 300° F. 10 psi and 1 second dwell time. The sealed samples were cut to 1×2.5 inches resulting in a 1.0 bonded area of 1 square inch. The test strips were suspended in a programmable oven and hung in a T-peel with a 50 g weight or a lap shear with a 250 g weight. The temperature of the oven was raised at 0.25° C. per minute and the temperature of bond failure was 1.5 recorded. A triplicate of each sample was run. The average standard deviation was 3.6° F.

EXAMPLES 1–8

The examples illustrate the preparation of a number of hot melt adhesives of this invention.

A heavy duty mixer equipped with a stirring paddle was used with a suitable container which had been heated to 320° F. and charged with 45 parts rosin dimer tackifier, commercially available as ZONATAC 105L from Arizona Chemical Company. This tackifying resin was completely melted. Stirring was then initiated whereupon 30 parts of an ethylene-vinyl acetate polymer ELVAX ® 46 was added slowly in order to prevent the formation of lumps. Heating and stirring were continued until a homogeneous mass was obtained whereupon 25 parts of the primary high molecular weight alcohol was added to reduce the melt viscosity of the system.

The cloud point was determined. The results are set forth in Table I.

TABLE I

| 45% TACKIFIER, 30% EVA (46% VA), 25% ALCOHOL | | |
|---|---|---|
| EX No. | $CH_3(CH_2CH_2)_x$—$CH_2$—OH | Cloud Pt. (°F.) |
| 1 | x = 7 | 104° F. |
| 2 | x = 10 | 140° F. |
| 3 | x = 11 | 170° F. |
| 4 | x = 14 | 184 |
| 5 | x = 18 | 206 |
| 6 | x = 24 | 222 |
| 7 | x = 34 | 284 |
| 8 | x = 70 | cloudy-incompatible |

EXAMPLES 9–16

A heavy duty mixer was equipped with a stirring paddle and used with a suitable container which had been heated to 320° F. and charges with 45 parts rosin dimer tackifier (ZONATAC ® 105L). This tackifying resin was completely melted. Stirring was then initiated whereupon 30 parts of an ethylene vinyl acetate copolymer ELVAX ® 46 was added slowly in order to prevent the formation of lumps. Heating and stirring were continued until a homogeneous mass was obtained. An oxygen-containing polymer (25 parts) was then added and the solution stirred. The cloud point, PAFT and SAFT of these samples are set forth in Table II.

TABLE II

45% TACKIFIER, 30% EVA (46% VA), OXYGEN-CONTAINING POLYMER @ 25%

| EX No | Oxygen-Containing Polymer | Cloud Pt. (° F.) | PAFT | SAFT |
|---|---|---|---|---|
| 9 | UNITHOX ® 480 | cloudy-incompat | 106.0° F. | 132.5° F. |
| 10 | UNILIN ® 550 | 202° F. | 130.7° F. | 179.7° F. |
| 11 | 228 MW alcohol | 104° F. | — | — |
| 12 | UNITHOX ® 410 | 187° F. | — | — |
| 13 | UNITHOX ® 420 | 200° F. | — | — |
| 14 | UNITHOX ® 450 | 250° F. | — | — |
| 15 | CERAMER ® 67 | 330° F. | — | — |
| 16 | UNICID ® 700 | 224° F. | — | — |

UNITHOX ® 480 is an ethoxylated alcohol having a molecular weight of 2125 which consists of 20 weight percent of unit A of formula IA (wherein R and $R_1$ are hydrogen) and 80 weight percent of unit B of formula IB.

UNILIN ® 550 and the 228 molecular weight alcohol have a molecular weight of 550 and 228 respectively and are of the formula (III) wherein R and $R_1$ are both hydrogen.

UNITHOX ® 410 is an ethoxylated alcohol having a molecular weight of 472, which consists of 90 weight percent of unit A of formula IA (wherein R and $R_1$ are hydrogen) and 10 weight percent of unit B of formula IB.

UNITHOX ® 420 is an ethoxylated alcohol having a molecular weight of 530, which consists of 80 weight percent of unit A of formula IA (wherein R and $R_1$ are hydrogen) and 20 weight percent of unit B of formula IB.

UNITHOX ® 450 is an ethoxylated alcohol of molecular weight 850 which consists of 50 weight percent of unit A of the formula IA (wherein R and $R_1$ are both hydrogen) and 50 weight percent of unit B of formula IB.

UNICID ® 700 is a high molecular weight carboxylic acid having a molecular weight of about 700, commercially available from Petrolite Polymer Division.

CERAMER ® 67 is a maleic anhydride graft polyethylene of molecular weight 655, commercially available from Petrolite Polymers Division.

EXAMPLE 17

Figure 1:
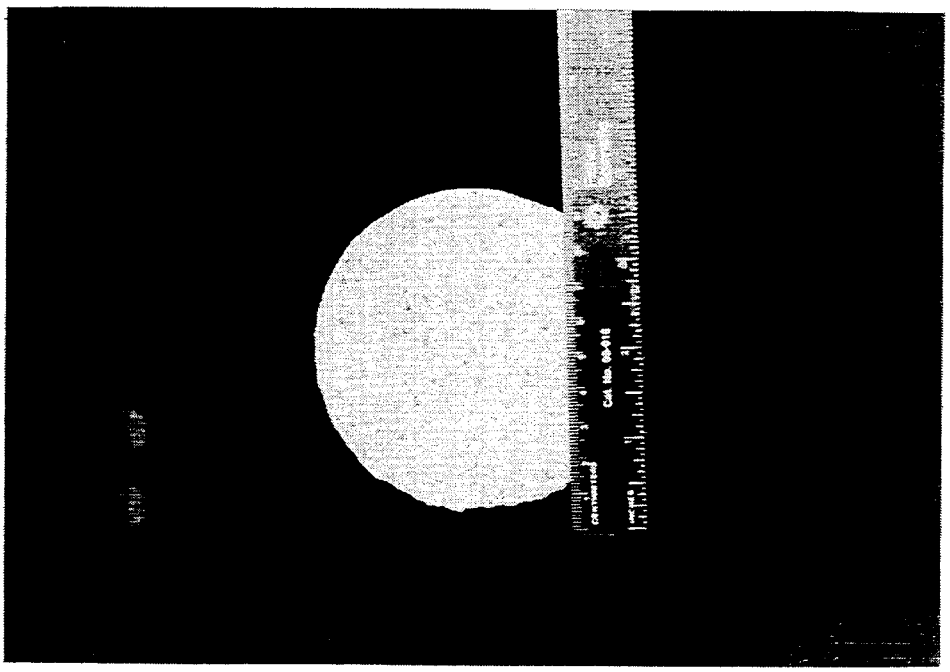
FIG. 1 is a photograph of repulped paper which contains a hot melt adhesive of this invention.

A molten sample of hot melt adhesive as prepared above in Example 14 was applied to paper. After cooling, two grams of paper with adhesive were cut into approximately one-half to one inch squares. (In a ½ inch square there was approximately 0.1 g of adhesive.) Two hundred grams of alkaline water (pH of 10) was added to a waring blender at a 120° F. Two grams of the cut paper with adhesive were then added to the blender and mixed for 15 minutes at a medium speed. The liquid was then poured through a 60 mesh screen. The filtrate was then vacuumed dried, pressed and then air dried. FIG. 1 is a photograph of a paper coated with the above hot melt adhesive.

A photograph of the repulped material as set forth in this Example 17 is depicted in FIG. I.

COMPARATIVE EXAMPLE

The procedure set forth above for Examples 1–8 was repeated except that a conventional ethylene vinyl acetate copolymer (having vinyl acetate content of approximately 28%) was substituted for the high vinyl acetate copolymer ELVAX ® and a conventional microcrystalline wax was substituted for the oxygen containing polymer. A heavy duty mixer equipped with a stirring paddle was used with a suitable container which had been heated to 350° F. and charged with 45 parts of rosin dimer tackifier ZONATAC 105L. This tackifying resin was completely melted whereupon stirring was initiated and 30 parts of an ethylene vinyl acetate copolymer containing approximately 28 weight percent of vinyl acetate units (commercially sold under the name ELVAX ® 240) was added slowly in order to prevent the formation of lumps. Heating and stirring were continued until a homogenous mass was obtained whereupon 25 parts of a microcrystalline wax (BE SQUARE ® 195) was added to reduce the melt viscosity of the system. FIG. 2 is a photograph of a repulped paper sample containing the composition.

EXAMPLE 18

A heavy duty mixer was equipped with a stirring paddle and was used with a suitable container which had been heated to 320° F. and charged with 45 parts resin dimer tackifier ZONATAC 105L. Upon melting the tackifying resin, 25 parts of a high molecular weight alcohol of Example 2 was added to reduce the melt viscosity of the system. The system was then cooled and packaged.

EXAMPLES 19-21

A heavy duty mixer was equipped with a stirring paddle and used with a suitable container which had been heated to 320° F. and charges with 45 parts rosin dimer tackifier (ZONATAC ® 105). This tackifying resin was completely melted. Stirring was then initiated whereupon 30 parts of an ethylene vinyl acetate copolymer ELVAX ® 46 was added slowly in order to prevent the formation of lumps. Heating and stirring were continued until a homogeneous mass was obtained. UNILIN ® 425 alcohol and UNITHOX ® 480 ethoxylate were added to the melt and stirred. The cloud point was then obtained. The results are set forth in Table III.

TABLE III

45% TACKIFIER, 30% EVA (46% VA), UNILIN/UNITHOX BLEND

| EX No. | Wt. % UNILIN | Wt. % UNITHOX | Cloud Pt. (° F.) |
|---|---|---|---|
| 19 | 75 | 25 | 282° F. |
| 20 | 60 | 40 | 336° F. |
| 21 | 50 | 50 | 352° F. |

UNILIN ® 425 alcohol has a molecular weight of 425 and is of the formula (III) wherein R and $R_1$ are both hydrogen.

What is claimed is:

1. A repulpable hot melt adhesive composition comprising:
   (i) an ethylene vinyl acetate copolymer having between about 40 to about 60 weight percent of vinyl acetate units;
   (ii) a tackifier; and
   (iii) an oxygen-containing polymer, having the formula:

$$A-B \qquad (I)$$

wherein the molecular weight of A is less than 2,000 and further wherein A is represented by an alkyl unit of the formula $$CH_3(\overset{R}{\underset{|}{C}}H\overset{R_1}{\underset{|}{C}}H)_x$$

and B is represented by a unit of the formula $$CH_2O(CH_2\overset{R_2}{\underset{|}{C}}HO)_yH$$

where R and $R_1$ are independently selected from the group consisting of hydrogen and a $C_1$–$C_{10}$ alkyl group; $R_2$ is hydrogen or a $C_1$–$C_5$ alkyl group; x is greater than or equal to 1 but less than 70; and y is between about 0.37 to about 45; provided the weight ratio of B/A+B is between 0 and 50 percent.

2. The composition of claim 1 wherein the molecular weight of the alkyl unit of the oxygen-containing polymer is less than 1,500.

3. The composition of claim 2 wherein the weight percent of vinyl acetate in the copolymer is between 45 and 50.

4. The composition of claim 1, wherein x is between about 9 to about 60.

5. The composition of claim 4, wherein x is between about 11 to about 45.

6. The composition of claim 4 wherein y is between about 1.7 to about 40.

7. The composition of claim 6 wherein y is between about 14 to about 25.

8. The composition of claim 4 wherein the A units of formula (I) are $$CH_3(CH_2CH_2)_x$$

and the B units are $$CH_2O(CH_2CH_2O)_yH$$
or
$$CH_2O(CH_2\underset{|}{C}HO)_y{-}H$$
$$\phantom{CH_2O(CH_2}CH_3$$

and mixtures thereof.

9. The composition of claim 1 wherein R and $R_1$ of the alcohol of formula (I) are independently selected from hydrogen and methyl.

10. The composition of claim 1 further comprising a linear or branched chain aliphatic hydrocarbon wax wherein the weight ratio of the oxygen-containing polymer to hydrocarbon is greater than 1:1.

11. The composition of claim 10 wherein the hydrocarbon is a wax selected from the group consisting of synthetic polyolefin waxes and natural waxes.

12. The composition of claim 11 wherein the wax is a synthetic polyethylene wax, microcrystalline wax, paraffin wax, Fischer-Tropsch wax or partially oxidized derivatives thereof.

13. The composition of claim 1 wherein a portion of the oxygen-containing polymer is substituted with an alkoxylated alcohol of the formula:

C–D wherein C is represented by a unit of the formula $$CH_3(\overset{R}{\underset{|}{C}}H\overset{R_1}{\underset{|}{C}}H)_g$$

and D is represented by a unit of the formula $$CH_2O(CH_2\overset{R_2}{\underset{|}{C}}HO)_hH$$

and further wherein R and $R_1$ are independently selected from the group consisting of hydrogen and a $C_1$–$C_{10}$ alkyl group; $R_2$ is hydrogen or a $C_1$–$C_5$ alkyl group; g is between about 1 to about 142; and h is between about 2 to about 817; provided that the weight ratio of D/C+D is between 51 and about 90 and the weight ratio of oxygen-containing polymer to alkoxylated alcohol is greater than 1:1.

14. The composition of claim 13 wherein g is between about 9 to about 113.

15. The composition of claim 14 wherein g is between about 11 to about 45.

16. The composition of claim 14 wherein h is between about 3 to about 65.

17. The composition of claim 13 wherein the weight ratio of D/C+D is between about 75 to about 85%.

18. A composition comprising a 5:95 to 95:5 weight ratio of
  (i) an ethylene vinyl acetate copolymer comprising between about 40 to about 60 weight percent of vinyl acetate units; and
  (ii) an alkoxylated alcohol of the formula

A–B          (I)

wherein A, the molecular weight of which is less than 2,000, is represented by a unit of the formula $$CH_3(\overset{R}{\underset{|}{C}}H\overset{R_1}{\underset{|}{C}}H)_x$$

and B is represented by a unit of the formula $$CH_2O(CH_2\overset{R_2}{\underset{|}{C}}HO)_yH$$

where R and $R_1$ and independently selected from the group consisting of hydrogen and a $C_1$–$C_{10}$ alkyl group; $R_2$ is hydrogen or a $C_1$–$C_5$ alkyl group; x is greater than or equal to 1 but less than 70; and y is between about 0.37 to about 45; provided the weight ratio of B/A+B is between 0 and 50 percent.

19. The composition of claim 18 wherein the molecular weight of the A unit is less than 1,500.

20. The composition of claim 18 wherein at least a portion of the alkoxylated alcohol is substituted with a linear or branched chain aliphatic hydrocarbon wax wherein the weight ratio of the alkoxylated alcohol to hydrocarbon is greater than 1:1.

21. The composition of claim 18 wherein a portion of the alkoxylated alcohol is substituted with a second alkoxylated alcohol of the formula

C–D wherein C is represented by the unit of the formula

and D is represented by the unit of the formula

and further wherein R and $R_1$ are independently selected from the group consisting of hydrogen and a $C_1$-$C_{10}$ alkyl group; $R_2$ is hydrogen or a $C_1$-$C_5$ alkyl group; g is between about 1 to about 142; and h is between about 2 to about 817; provided that the weight ratio of D/C+D is between 51 and about 90 and further wherein the weight ratio of alkoxylated alcohol (I) to second alkoxylated alcohol is greater than 1:1.

22. In a hot melt adhesive composition comprising ethylene vinyl acetate copolymer, wax and a tackifier, the improvement being using an ethylene vinyl acetate copolymer having between about 40 to about 60 weight percent of vinyl acetate units in combination with an alkoxylated alcohol wherein the weight ratio of ethylene vinyl acetate copolymor to alkoxylated alcohol is between about 5:95 to 95 to about 95:5 and the alkyl portion of said alkoxylated alcohol has a molecular weight less than 3,000, and further wherein the alkoxylated about alcohol is of the formula:

$$A-B \qquad (I)$$

wherein A, the alkyl portion, is represented by a unit of the formula

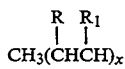

and B is represented by a unit of the formula

where R and $R_1$ are independently selected from the group consisting of hydrogen and a $C_1$-$C_{10}$ alkyl group; $R_2$ is hydrogen or a $C_1$-$C_5$ alkyl group; x is greater than or equal to 1 but less than 70; and y is between about 0.37 to about 45; provided the weight ratio of B/A+B is between 0 and 50 percent such that the hot melt adhesive is repulpable.

23. A repulpable hot melt adhesive composition comprising:
(A) an othoxylated alcohol of the formula:

$$A-B \qquad (I)$$

wherein A is represented by a unit of the formula $$CH_3(CH_2CH_2)_x$$

and B is represented by a unit of the formula $$CH_2O(CH_2CH_2O)_yH$$

where R, $R_1$, and $R_2$ are hydrogen which consists of 90 wt. percent of unit A and 10 wt., percent of unit B;
(B) an ethylene vinyl acetate copolymer comprising between about 40 to about 60 weight percent of vinyl acetate units; and
(c) a tackifier.

24. The composition of claim 23 further comprising a linear or branched chain aliphatic hydrocarbon was wherein the weight ratio of the othoxylated alcohol to hydrocarbon is greater than 1:1.

25. The composition of claim 23 wherein a portion of the ethoxylated alcohol is substituted with a second alkoxylated alcohol of the formula:

$$C-D$$

wherein C is represented by a unit of the formula

and D is represented by a unit of the formula

and further wherein R and $R_1$ are independently selected from the group consisting of hydrogen and a $C_1$-$C_{10}$ alkyl group; $R_2$ is hydrogen or a $C_1$-$C_5$ alkyl group; g is between about 1 to about 142; and h is between about 2 to about 817; provided that the weight ratio of D/C+D is between 51 and about 90 and the weight ratio of ethoxylated alcohol (I) to second alkoxylated alcohol is greater than 1:1.

* * * * *

UNITED STATES PATENT AND TRADEMARK OFFICE
CERTIFICATE OF CORRECTION

PATENT NO. : 5,414,039
DATED : May 9, 1995
INVENTOR(S) : Michael D. Watson et al.

It is certified that error appears in the above-indentified patent and that said Letters Patent is hereby corrected as shown below:

Column 15, line 28, delete "to 95".

Column 15, line 30, change "3,000" to --2,000--.

Column 16, line 5, change "othoxylated" to --ethoxylated--.

Column 16, line 23, change "was" to --wax--.

Column 16, line 24, change "othoxylated" to --ethoxylated--.

Column 16, line 35, change "x" to --g--.

Column 16, line 43, change "y" to --h--.

Signed and Sealed this

Eighth Day of August, 1995

Attest:

BRUCE LEHMAN

Attesting Officer      Commissioner of Patents and Trademarks